(12) United States Patent
Jakobsson et al.

(10) Patent No.: US 10,362,024 B2
(45) Date of Patent: *Jul. 23, 2019

(54) SYSTEM AND METHODS FOR SECURE ENTRY OF A PERSONAL IDENTIFICATION NUMBER (PIN)

(71) Applicant: PAYPAL, INC., San Jose, CA (US)

(72) Inventors: Bjorn Markus Jakobsson, Portola Valley, CA (US); James Roy Palmer, San Jose, CA (US); William Leddy, Georgetown, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,067

(22) Filed: Jun. 7, 2016

(65) Prior Publication Data

US 2016/0285857 A1 Sep. 29, 2016
US 2018/0152435 A9 May 31, 2018

Related U.S. Application Data

(63) Continuation of application No. 13/826,570, filed on Mar. 14, 2013, now Pat. No. 9,390,256, and a
(Continued)

(51) Int. Cl.
*H04L 29/06* (2006.01)
*G06F 21/45* (2013.01)
(Continued)

(52) U.S. Cl.
CPC ........ *H04L 63/083* (2013.01); *G06F 3/04842* (2013.01); *G06F 21/31* (2013.01);
(Continued)

(58) Field of Classification Search
CPC ..... H04L 9/3231; H04L 63/083; G06F 21/32; G06F 3/04842; G07C 9/00158; G06Q 20/40145
(Continued)

(56) References Cited

U.S. PATENT DOCUMENTS 6,282,553 B1 * 8/2001 Flickner .................. G06F 3/013
345/156
7,392,388 B2 * 6/2008 Keech .................... G06Q 20/02
713/168

(Continued)

FOREIGN PATENT DOCUMENTS

GB 2 281 838 A 3/1995
WO WO 00/48076 A1 8/2000
(Continued)

OTHER PUBLICATIONS

Hirsch Electronics ScramblePad® published in 2005, 4 pages.*
(Continued)

*Primary Examiner* — Ellen Tran
(74) *Attorney, Agent, or Firm* — Haynes and Boone, LLP

(57) ABSTRACT

Systems and methods for credential character selection are provided. The system includes one or more sensors configured to detect a character selection and generate a character selection signal, and detect a character selection completion and generate a character selection completion signal. The system also includes one or more processors coupled to the one or more sensors, the one or more processors configured to receive the character selection signal and the character selection completion signal, and generate an output signal based on the received character selection signal that includes components of a credential. The system also includes a network interface component configured to transmit the output signal. The credential characters may be components of a PIN or password. Moreover, the credential character
(Continued)

selections may be made on one device, but displayed on a separate coupled device. The character selections may be a selection of a character or a modification of character.

20 Claims, 13 Drawing Sheets

Related U.S. Application Data continuation-in-part of application No. 13/413,063, filed on Mar. 6, 2012, now Pat. No. 9,083,532.

(60) Provisional application No. 61/706,691, filed on Sep. 27, 2012.

(51) Int. Cl.
*G06F 21/31* (2013.01)
*G06F 3/0484* (2013.01)
*G06Q 20/40* (2012.01)

(52) U.S. Cl.
CPC .......... *G06F 21/45* (2013.01); *G06Q 20/40* (2013.01); *G06F 2221/031* (2013.01)

(58) Field of Classification Search
USPC ........................................................ 713/186
See application file for complete search history.

(56) References Cited

U.S. PATENT DOCUMENTS

| | | | |
|---|---|---|---|
| 7,986,816 B1 | 7/2011 | Hoanca et al. | |
| 8,117,458 B2 | 2/2012 | Osborn et al. | |
| 9,083,532 B2 | 7/2015 | Leddy et al. | |
| 9,390,256 B2 | 7/2016 | Jakobsson et al. | |
| 2002/0095589 A1* | 7/2002 | Keech | G06F 21/6209 713/189 |
| 2003/0076300 A1* | 4/2003 | Lauper | G06F 3/013 345/158 |
| 2003/0210127 A1 | 11/2003 | Anderson | |
| 2005/0010768 A1 | 1/2005 | Light et al. | |
| 2005/0127166 A1* | 6/2005 | Minemura | G06K 19/07 235/380 |
| 2005/0262555 A1* | 11/2005 | Waterland | G06F 21/36 726/21 |
| 2006/0089909 A1 | 4/2006 | McLeod et al. | |
| 2008/0137916 A1 | 6/2008 | Lauper et al. | |
| 2009/0063963 A1* | 3/2009 | Fux | G06F 3/018 715/263 |
| 2009/0276839 A1 | 11/2009 | Peneder | |
| 2010/0153735 A1* | 6/2010 | Guenthner | G06F 21/34 713/183 |
| 2010/0191653 A1 | 7/2010 | Johnson et al. | |
| 2010/0205667 A1 | 8/2010 | Anderson et al. | |
| 2011/0072375 A1 | 3/2011 | Victor | |
| 2012/0110634 A1 | 5/2012 | Jakobsson | |
| 2013/0239187 A1 | 9/2013 | Leddy et al. | |

FOREIGN PATENT DOCUMENTS

| | | |
|---|---|---|
| WO | WO 2005/010836 A | 2/2005 |
| WO | WO 2008/081452 A2 | 7/2008 |
| WO | WO 2012/004395 A | 1/2012 |

OTHER PUBLICATIONS

Method of Access Control via Gestural Verification by IBM Published in 1993, 2 pages.
PCT International Search Report and the Written Opinion dated Mar. 13, 2014, in related international Application No. PCT/US2013/058321.
M. Kumar et al., "Reducing Shoulder-surfing by Using Gaze-based Password Entry", published in 2007.
A. De Luca et al., "Evaluation of Eye-Gaze Interaction Methods for Security Enhanced PINEntry", published in 2007.
'Blue Moon Authetication', Blue Moon [online], Jan. 6, 2009. Retrieved on Jun. 4, 2012. Retrieved from the internet: <http://blue-moon-authentication.com/>.
'Visual Blue Moon Authentication', Blue Moon[online], Dec. 19, 2009. Retrieved on Jun. 4, 2012. Retrieved from the internet: <http://securitycartoon.com/bluemoonvisual/setup.php>.
'Something you know . . . Something you are . . . Something you have . . . silently protecting you', Ravenwhite Inc, [online], Feb. 2, 2011, Retrieved on Jun. 4, 2012. Retrieved from the internet: <http://www.ravenwhite.com/.
'Visual Blue Moon Authentication', Blue Moon [offline], Feb. 3, 2011. Retrieved on Jun. 4, 2012. Retrieved from the internet: <http://visual-blue-moon-authentication.com/>.
'Visual Blue Moon Authentication', Blue Moon [online], Feb. 2, 2011. Retrieved on Jun. 4, 2012. Retrieved from the internet: <http://mobile-blue-moon-authentication.com/>.
'I forgot my password! (Now what?) The Blue Moon Authentication System', Ravenwhite Inc. [online], Feb. 8, 2011. Retrieved on Jun. 4, 2012. Retrieved from the internet: <httrp://www.ravenwhite.com/iforgotmypassword.html>.
UK Patent Application GB 2 281 838, Input for a Virtual Reality System by Michihiro Kaneko, Published Mar. 15, 1995.
WO 2005/010836 World Intellectual Property Organization, Improvements Introduced in Equipment Used In Security, Commercial, and Bank Automation Systems by Joao Ernesto Sena, Published Feb. 3, 2005.

* cited by examiner

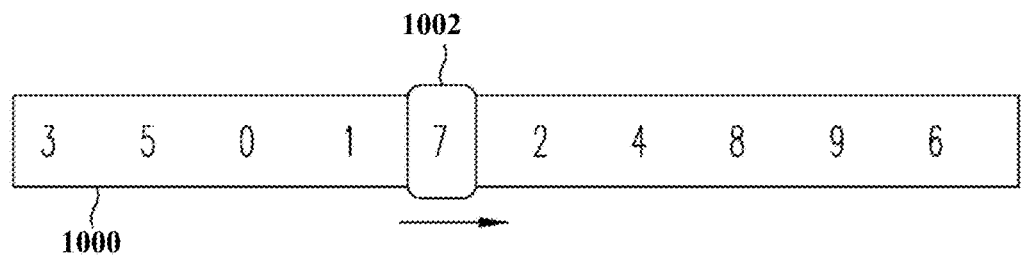
FIG. 10
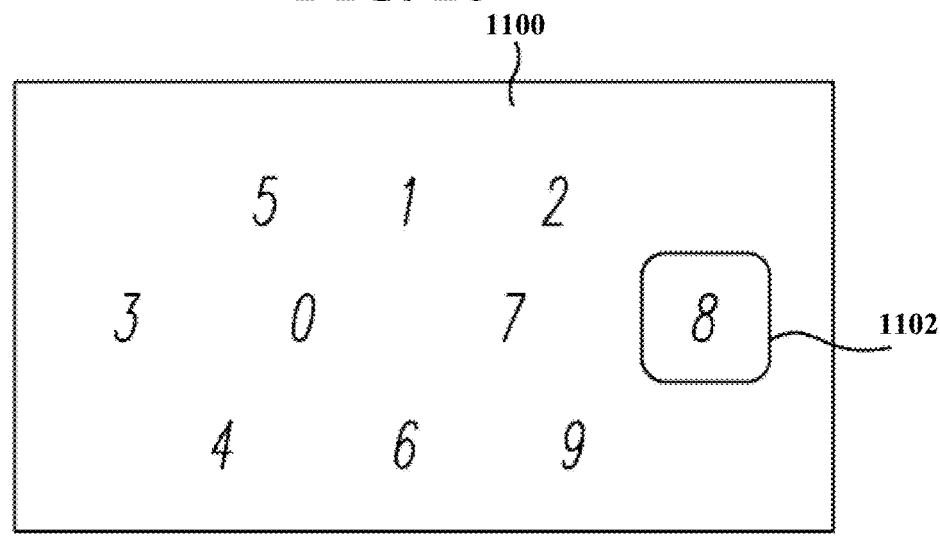
FIG. 11
FIG. 12

SYSTEM AND METHODS FOR SECURE ENTRY OF A PERSONAL IDENTIFICATION NUMBER (PIN)

CROSS REFERENCE TO RELATED APPLICATIONS

This application is a Continuation of U.S. patent application Ser. No. 13/826,570 filed on Mar. 14, 2013, which is a Continuation-in-Part of U.S. patent application Ser. No. 13/413,063, filed on Mar. 6, 2012, that is issued as U.S. Pat. No. 9,083,532. This application also claims priority to U.S. Provisional Application No. 61/706,691, filed on Sep. 27, 2012. The entire contents of these applications are hereby incorporated by reference herein in their entirety.

BACKGROUND

Technical Field

Embodiments disclosed herein are related to systems and methods for enabling the secure entry of credentials such as personal identification numbers (PINs). In particular, systems and methods disclosed herein may provide for the secure input of a PIN on an input device that has one or more sensors used to receive inputs and transmit the inputs to a display device coupled to the input device.

Related Art

Integrated circuit (IC) cards, also known as "Chip and PIN" cards or Europay, MasterCard and Visa (EMV) cards have become the standard financial transaction cards, also known as credit or debit cards, that are used in Europe. These cards include an integrated circuit chip embedded thereon which is designed to be read by an IC chip reader at a point of sale (POS) terminal when conducting a financial transaction, such as purchasing goods. In order to authenticate the transaction, the payer is typically required to enter a PIN associated with the IC chip using a keypad on the POS terminal. In addition to, or instead of, entering a PIN, a payer may be required to authenticate the transaction using a signature.

Modern mobile devices are capable as acting as POS terminals using a card reader in communication with the mobile device, such as the PayPal Here™ device offered by PayPal of San Jose, Calif. However, these devices are currently only able to process traditional magnetic stripe financial transaction cards. Efforts to develop an IC chip reader for use with a mobile device have had difficulty in gaining approval and certification due to the inherent insecurity of the mobile device. Mobile devices may have malware executing thereon which may be designed to capture a user's PIN or other information from the IC chip that could be read by a mobile IC chip reader.

Accordingly, there is a need for a system and method that enables the secure entry of credentials such as personal identification numbers (PINs). In particular, there is a need for systems and methods that allow the secure input of a PIN associated with an integrated circuit chip embedded on a financial transactions card by using a mobile device that is communication with a card and integrated circuit chip reader that is in communication with the mobile device and displays the PIN.

BRIEF DESCRIPTION OF THE FIGURES

FIG. 10 is a diagram illustrating a one dimensional random sequence of characters of a credential, consistent with some embodiments.

FIG. 11 is a diagram illustrating a two dimensional random sequence of characters of a credential, consistent with some embodiments.

FIG. 12 is a diagram illustrating a two dimensional random array of characters of a credential, consistent with some embodiments.

Figure 1:
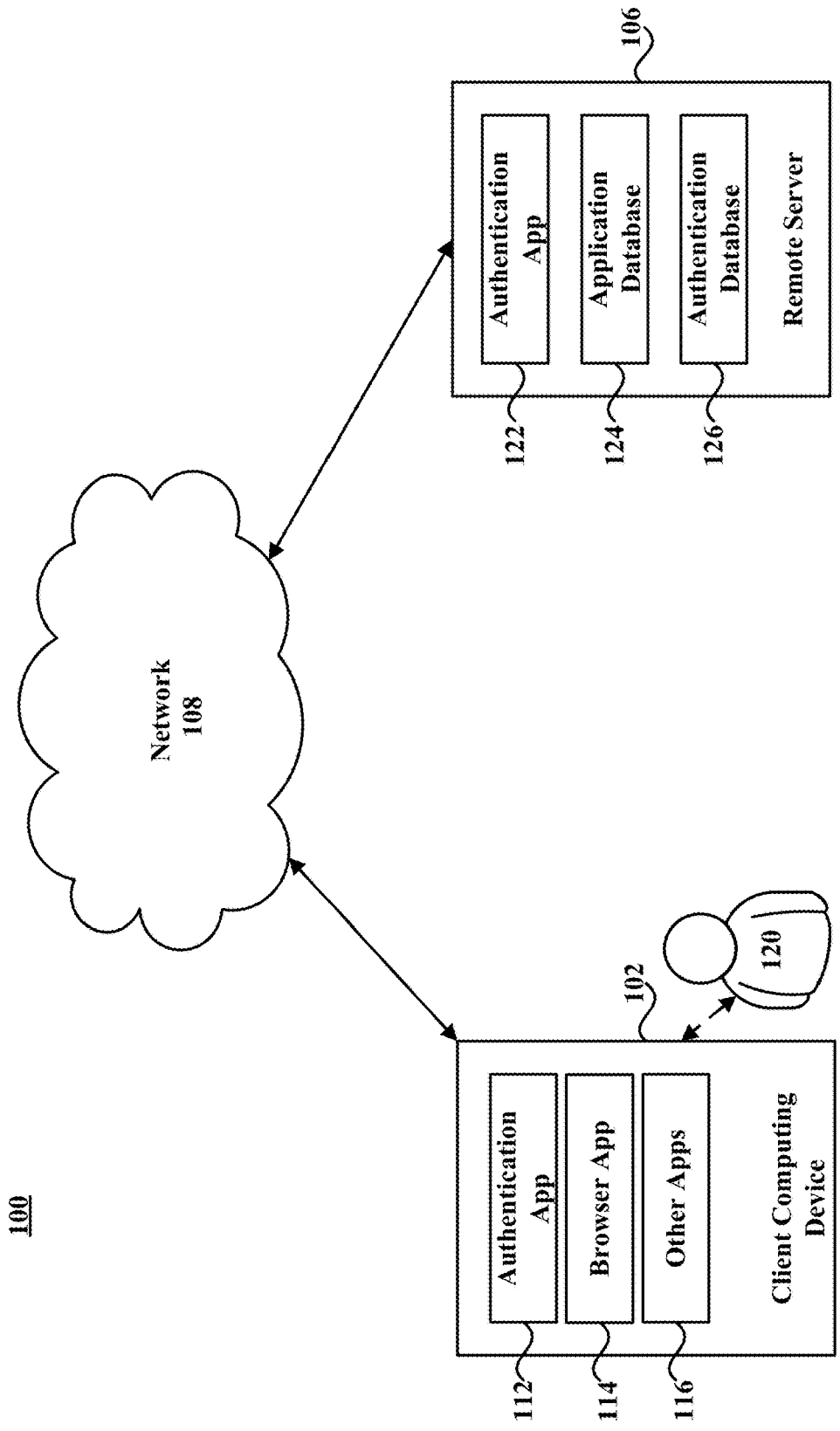
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided a system for credential character selection. The system includes one or more sensors, the one or more sensors configured to detect a character selection and generate a character selection signal, and detect a character selection completion and generate a character selection completion signal. The system also includes one or more processors coupled to the one or more sensors, the one or more processors configured to receive the character selection signal and the character selection completion signal, and generate an output signal based on the received character selection signal, the output signal including components of a credential. The system further includes and a network interface component configured to transmit the output signal.

Consistent with some embodiments, there is also provided a method of credential character selection. The method includes steps of detecting a character selection, generating a character selection signal, detecting a character selection completion, generating a character selection completion signal, receiving the generated character selection signal and the generated character selection completion signal, and generating, by the one or more processors, an output signal including components of a credential; and transmitting the output signal.

Consistent with some embodiments, there is also provided a display unit. The display unit includes one or more processors configured to produce an initial state, modify the initial state based on received modifications to the initial state, and encrypt a final state based on a received indication that the final state has been achieved. The display unit also includes a memory coupled to the one or more processors, and a network interface component configured to receive the modifications to the initial state, receive the indication that a final state has been achieved, and transmit the encrypted final state. The display unit also includes a display coupled to the one or more processors, the display configured to display the initial state, the modifications to the initial state, and the final state.

Consistent with some embodiments, there is also provided an input device. The input device includes one or more processors, a memory coupled to the one or more processors, one or more sensors configured to generate user signals based on detected user actions; a user interface configured to receive the user signals, and network interface component in communication with a display unit, the network interface component configured to transmit the received user signals to the display unit, wherein the user signals comprise modifications to an initial state of the display unit and an indication of a final state of the display unit.

Consistent with some embodiments, there is further provided a method for inputting a personal identification number (PIN), using a display unit that displays the PIN. The method includes steps of generating, by the display unit, an initial PIN state, displaying, by the display unit, the initial PIN state, receiving, by the display unit, signals for modifying the displayed initial PIN state, receiving, by the display unit, signals indicating that the modified PIN state is a final PIN state, and encrypting, by the display unit, the final PIN state; and transmitting the final PIN state.

A computer-readable medium is provided. The computer-readable medium may include instructions that, when executed by one or more processors of a computing device cause the computing device to perform a method of credential character selection. The method includes steps of displaying a sequence of credential characters, highlighting a first credential character in the sequence; periodically highlighting remaining credential characters in the sequence at a predetermined rate, detecting a credential character selection, determining timing information from the detected credential character selection and the predetermined rate, detecting a character selection completion, generating a character selection completion signal, reconstructing a credential based on the based on the determined timing information, and transmitting an output signal including the reconstructed credential.

These and other embodiments will be described in further detail below with respect to the following figures.

FIG. 1 is a block diagram of a networked system 100, consistent with some embodiments. System 100 includes a client computing device 102 and a remote server 106 in communication over a network 108. Remote server 106 may be a payment service provider server that may be maintained by a payment provider, such as PayPal, Inc. of San Jose, Calif. Remote server 106 may be maintained by other service providers in different embodiments. Remote server 106 may also be maintained by an entity with which sensitive credentials and information may be exchanged with client computing device 102. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 108. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices. Consistent with some embodiments, client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. For example, such instructions may include authentication app 112 for authenticating client computing device 102 to remote server 106. Consistent with some embodiments, authentication app 112 may be a mobile authentication app, which may be used to authenticate user 120 to remote server 106 over network 108. Authentication app 112 may include a software program, such as a graphical user interface (GUI), executable by one or more processors that is configured to interface and communicate with the remote server 106 or other servers managed by content providers or merchants via network 108. Authentication app 112 may interface with a display unit that may be coupled to client computing device 102 and configured to display characters of a credential that may be used to authenticate with remote server 106. Authentication app 112 may also interface with one or more sensors coupled to and/or integrated in client computing device 102 for detecting character selection, modification, and completion signals, which may be indicative of user 120 indicating characters of a credential that may be used to authenticate with remote server 106.

Client computing device 102 may include a browser app 114. Browser app 114 may be a mobile browser app, which may be used to provide a user interface to permit a user 120 to browse information available over network 108. For example, browser application 114 may be implemented as a web browser to view information available over network 108. Browser application 114 may include a software program, such as a graphical user interface (GUI), executable by one or more processors that is configured to interface and communicate with remote server 106 or other servers managed by content providers or merchants via network 108. For example, user 116 is able to access websites to find and purchase items, as well as access user account information or web content. Client computing device 102 may also include other applications 116 as may be desired in one or more embodiments to provide additional features available to user 120, including accessing a user account with remote server 106. For example, applications 116 may include interfaces and communication protocols that allow the user to receive and transmit information through network 108 and to remote server 106 and other online sites. Applications 116 may also include security applications for implementing client-side security features, programmatic client applications for interfacing with appropriate application programming interfaces (APIs) over network 108 or various other types of generally known programs and/or applications. Applications 116 may include mobile apps downloaded and resident on client computing device 102 that enables user 120 to access content through the apps.

Remote server 106, according to some embodiments, may be maintained by an online payment provider, which may provide processing for online financial and information transactions on behalf of user 120. Remote server 106 may include at least authentication application 122, which may be adapted to interact with authentication app 112 of client computing device 102 over network 108 to authenticate client computing device 102 to remote server 106. According to some embodiments, authentication app 122 may send information over network 108 to client computing device 102 for use by authentication app 112 for authenticating user 122 to remote server 106.

Remote server 106 may also include an application database 124 for storing various applications for interacting with client computing device 102 over network 108 for purposes other than authentication. Such applications may include applications for authentication, conducting financial transactions and shopping and purchasing items. Remote server 106 may also include an authentication database 126 that may store information for authentication application 122 to use during authentication. Authentication database 126 may also store information about user 120, such as account information, personal information, and stored credentials of user 120.

Figure 2:
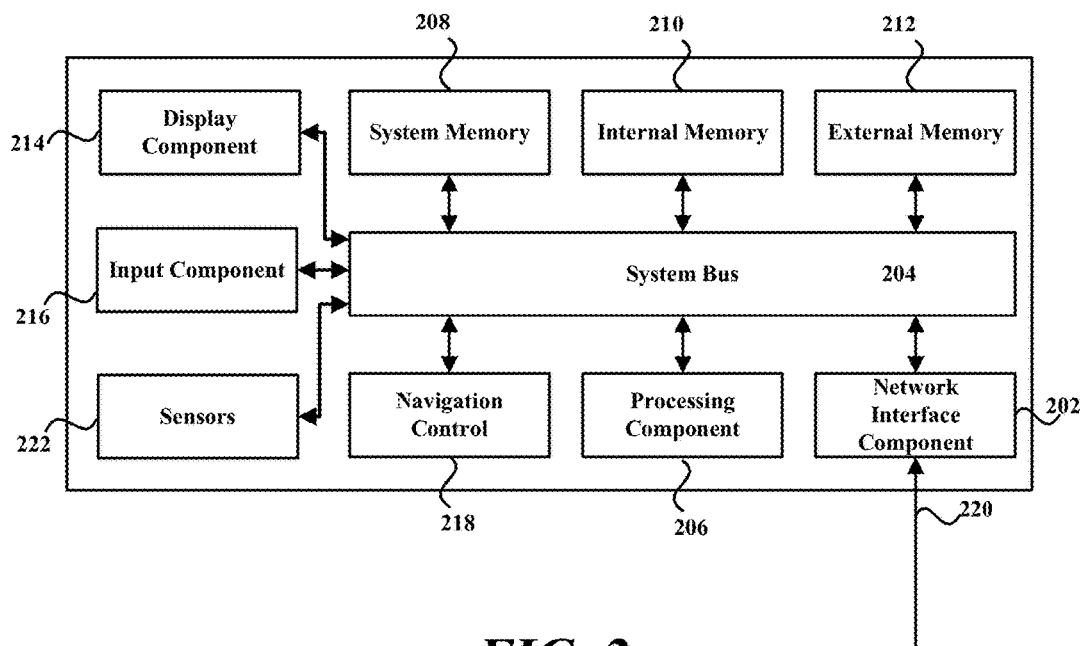
FIG. 2 is a diagram illustrating a computing system, consistent with some embodiments.

FIG. 2 is a diagram illustrating computing system 200, which may correspond to either of client computing device 102 or remote server 106, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 120 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 120 of computing system 200 to input information to computing system 200. Such information could include payment information such as an amount required to complete a transaction, account information, authentication information such as a credential, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222. Sensor components 222 may include any sensory device that captures information related to the surroundings of computing system 200. Sensor components 222 may include camera and imaging components, accelerometers, GPS devices, motion capture devices, and biometric sensors, and other devices that are capable of providing information about computing system 200, user 120, or their surroundings. In some embodiments, sensor components 222 including an accelerometer may be used to detect a motion of computing system 200 made by a user that may be indicative of a user recognition of a displayed character or digit of a credential. Sensor components 222 may include a microphone configured to detect a voice of user 120 and translate the detected voice into an electrical signal that may be interpreted by processing component as being indicative of a user recognition of a displayed character or digit of a credential, or as corresponding to a particular number, action, or direction in entering a credential. For example, user 120 may say the credential aloud and the microphone will detect this and translate this into text corresponding to the credential. In another example, user 120 may be presented with credential components, and may be able to speak an indication, such as "yes", "ok", "that's it", etc. to indicate that a particular credential component corresponds to a user credential component. User 120 may be able to further speak "next", "left", "right", etc. to select additional credential components.

Sensor components 222 may include one or more physiological response sensors. In some embodiments, a physiological response may be a slight or subtle facial or body movement. For example, the user can blink, wink, smile, frown, wave, or make a subtle facial movement, the user's voice or another sound made or controlled by the user. Physiological response sensors may include cameras and microphones, and the like. Sensor components 222 may also include brain activity sensors. Brain activity sensors may be part of a hat, helmet, or other item that is worn or placed in close proximity with a user's head. Brain activity may be such as sensing the user concentrating, tensing muscles, or doing nothing conscious. Brain activity may be sensed by an EEG that can sense brain activity associated with a thought, a muscle contraction, or a user recognition of a displayed character or digit of a credential. Sensor components 222 may include a button and/or can sense when a button or other switch or input device is actuated. The button can be hidden from view by bystanders. The button can be shielded from view such that a user's hand that is operating the button is also shielded from view. Sensor components 222 may include capacitive or other touch screen sensing components, such as may be found in a touch-screen computing device. Sensor components 222 may include a camera. The camera can capture images that are indicative of a physiological response. The camera may be a visible light camera or a depth-sensing camera, such as the Microsoft® Xbox™ Kinect™ camera. The camera may also be configured to detect infrared (IR) light or ultraviolet (UV) light. The camera may also be a stereo camera, a time-of-flight (ToF) camera, or other camera capable of detecting capturing information about computing system 200, user 120, or their surroundings. Sensor components 222 may be integrated with computing system 200 or may be separate from and coupled to computing system 200. Sensor components 222 may interface with at least one of input component 216 and navigation control component 218 such that information captured by the sensor may be used for input and/or navigation control. In some embodiments, information captured by sensor components 222 may be used to modify and select characters of a credential.

Figure 3:
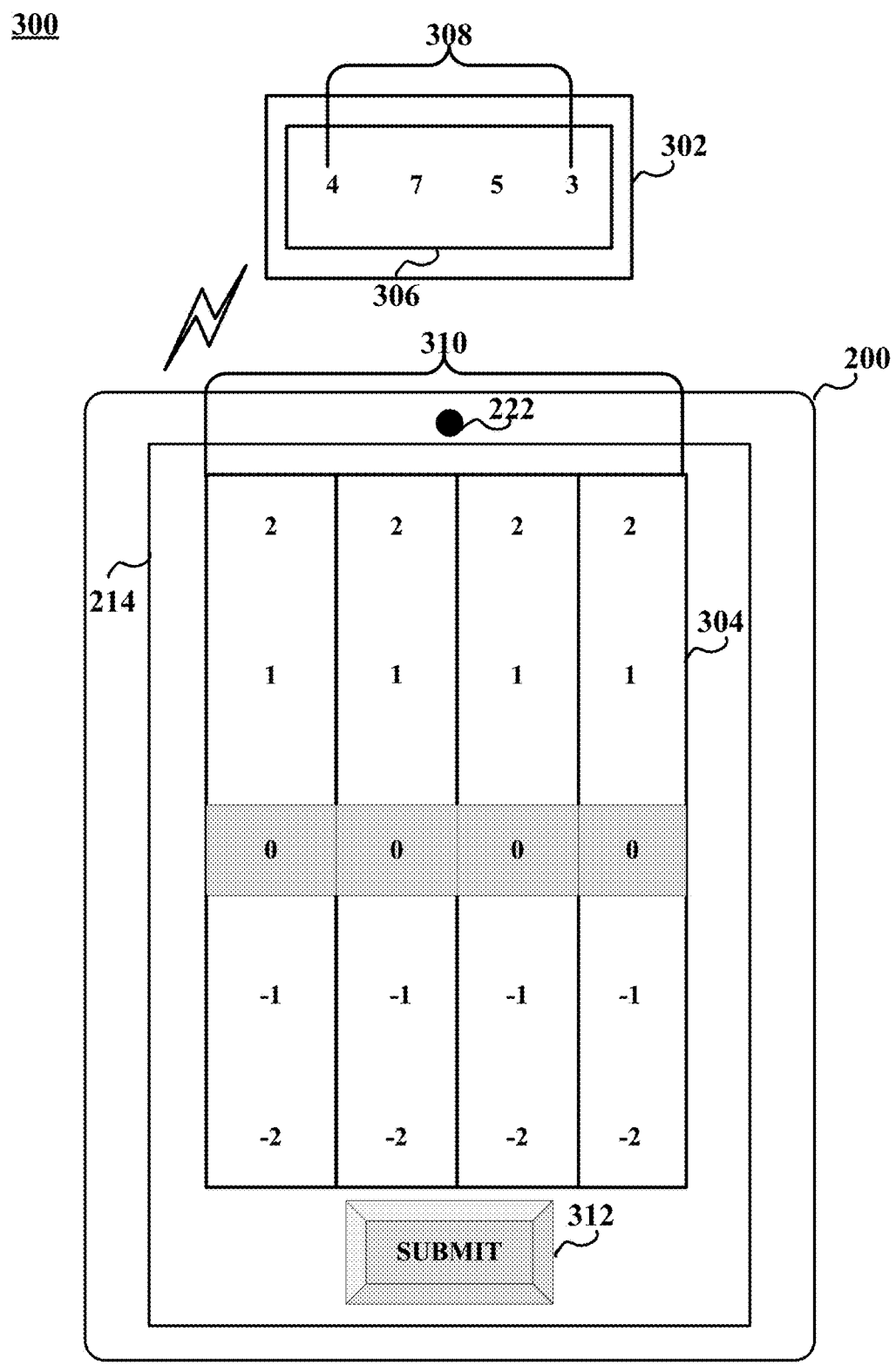
FIG. 3 is a diagram illustrating a system including a computing system in communication with a display unit, consistent with some embodiments.

FIG. 3 is a diagram illustrating a system including a computing system in communication with a display unit, consistent with some embodiments. As shown in FIG. 3, system 300 includes computing system 200 in communication with a display unit 302. In some embodiments, computing system 200 may correspond to client computing device 102 shown in FIG. 1. Display unit 302 may include one or more processors (not shown) and a machine-readable medium, such as a memory (not shown) that includes instructions for execution by the one or more processors (not shown) for causing display unit 302 to perform specific tasks. For example, such instructions may include displaying content, such as a user credential, modifications to the user credential, an initial random or pseudo-random state of the user credential, and a final state of the user credential. In some embodiments, at least the displayed user credential, modifications to the user credential, and an indication of a final state of the user credential may be received from computing system 200, which may be in communication with display unit 302.

Computing system 200 may be in communication with display unit 302 using a wireless connection, such as a Bluetooth™ connection, a Wi-Fi connection, an infrared (IR) connection, or other such wireless connections. Computing system 200 may also be in communication with display unit 302 using a wired connection or, in some embodiments, display unit 302 may be directly coupled to mobile device using a plug-in coupling. As shown in FIG. 1, computing system 200 may include a user interface 304 that is configured to receive inputs from a user for modifying a state displayed by display unit 302. User interface 304 may be displayed by a display component 214 of computing system 200.

Although not shown, display unit 302 may also include one or more processors, a memory, and a network interface component similar to the one or more processors, memory, and network interface component of computing system 200, described above. The one or more processors, memory, and network interface component may be integrated on a single integrated circuit, such as an application-specific integrated circuit (ASIC), or on multiple integrated circuits. In some embodiments, display unit 302 is a minimalist device that may not be running any operating system and, thus, may not be susceptible to malware. In some embodiments, display unit 302 may be a secure device that is only in communication with computing system 200, making it more difficult for malware to reach display unit 302. In such embodiments, display unit 302 may only be in communication with a single computing system 200 at a time, but computing system 200 in communication with display unit 302 may be changed by a user.

Display unit 302 may also include a display component 306 that may be a liquid crystal display (LCD) screen, an organic light emitting diode (OLED) screen (including active matrix AMOLED screens), an LED screen, a plasma display, or a cathode ray tube (CRT) display. Consistent with some embodiments, the one or more processors of display unit 302 may be configured to execute instructions stored in memory to display a state on display component 306. The displayed state may be an initial state that is generated by the one or more processors of display unit. Further, the initial state may be generated randomly or pseudo-randomly. The network interface component of the display unit 302 may be configured to receive signals from computing system 200 corresponding to modifications of the displayed initial state input by a user using computing system 200. As the signals corresponding to modifications are received, the one or more processors will process the received signals to determine the modification being made to the displayed initial state and provide instructions to display component 306 for displaying the modified state. Display unit 302 may have an associated media access control (MAC) address. The MAC address may be used in authentication of a final state.

Consistent with some embodiments, display unit 302 may include two or more networked devices in communication with one another. In such embodiments, the initial state may be generated on one device, for example, while the generated initial state is transmitted to another device that includes the display component and displays the generated initial state. According to some embodiments, the one or more processors and memory may be in the device that generates the initial state, while the display component is in the device that displays the initial state. Moreover, all of the networked devices in communication with each other may include a network interface component.

As shown in FIG. 3, display unit 302 displays an initial state 308 that includes four digits. Although only four digits are shown, display unit 302 may be capable of displaying n digits or characters, consistent with the specifications of display component 306. User interface 306 of computing system 200 displays one or more modifiers 310 that are used as inputs for transmitting signals indicative of modifications to initial state 308. Consistent with some embodiments, modifiers 310 may represent a specific increment or decrement of the digits of the initial state. For example, as shown in FIG. 3, initial state 308 is displayed as "4753". A user using computing system 200 may use modifiers 310 to increment or decrement the digits of initial state 308 such that moving a the first modifier 310 to "−2" would send a signal to display unit 302 to decrement initial state by 2 to a state of the first digit of initial state 308 to "2", resulting in a displayed state of "2753". Similar inputs may be made using modifiers 310 until user decides that the displayed state is a final state. When a final state is reached, the user may select the "SUBMIT" button 312 which initiates a transmission of a signal to display unit 302 that a final state has been reached.

When display unit 302 receives the signal indicating that a final state has been reached, display unit 302 transmits the final state to computing system 200. Consistent with some embodiments, display unit 302 may include instructions stored in the memory for execution by the one or more processors for encrypting the final state before transmitting the final state to computing system 200. Once computing system 200 receives the final state, computing system 200 may then transmit the final state, along with other information, to the remote server. The other information may include, for example, account information and payment details. In some embodiments, computing system 200 may check an accuracy or correctness of the final state before transmitting to the remote server. In some embodiments, display unit 302 may determine a correctness or accuracy of the final state before transmission to mobile device. In some embodiments, display unit 302 may be in communication with the remote server and may be capable of transmitting the final state and any other information, which may be encrypted, to the remote server, wherein such communications are secure.

In some embodiments, a user, such as user 120, may interact with the modifiers 310 by touching modifiers and scrolling modifiers 310 in a direction if display component 214 is a touch-screen display. In some embodiments, a user may interact with modifiers 310 using an input component, such as input component 216, which may include, for example, a keyboard or key pad, whether physical or virtual. In some embodiments, a user may interact with modifiers 310 using a navigation control component, such as navigation control component 218 which may be a mouse, a trackball, or other such device. Moreover, a user may interact with modifiers 310 using sensors 222 which may be, for example, a camera or a microphone. In some embodiments, the device or component used to interact with modifiers 310 may be referred to as a sensor or sensors that are used to sense a state or character modification that may generate a signal for modifying characters or digits of a credential, such as initial state 308. In some embodiments, the generated signal may be transmitted from computing system 200 to display unit 302 and may include instructions for modifying a state, such as initial state 308, displayed on display unit 302, or individual characters within a displayed state. In some embodiments, a displayed state may correspond to a credential, with individual digits, elements, or characters of the state corresponding to digits, elements, or characters of the credential. In some embodiments, the credential may correspond to a personal identification number (PIN). In some embodiments, the PIN may be a PIN generated based on a password, such as described in U.S. patent application Ser. No. 13/281,273, filed on Oct. 25, 2011, the entire contents of which is incorporated by reference herein in its entirety. In some embodiments, the credential may correspond to a secret identifier, which may be a credential that is known to user 120, and may be a number associated with user 120, or a combination of numbers associated with user 120. In one embodiment, a secret identifier may correspond to the last four digits of a Social Security number of user 120. In another embodiment, a secret identifier may correspond to a combination of the last four digits of a Social Security number of user 120 and a Zone Improvement Plan (ZIP) code of residence of user 120. In some embodiments, display unit 302 may include a card and/or integrated circuit (IC) chip reader, and the state may correspond to a credential associated with the card and/or IC chip.

Figure 4:
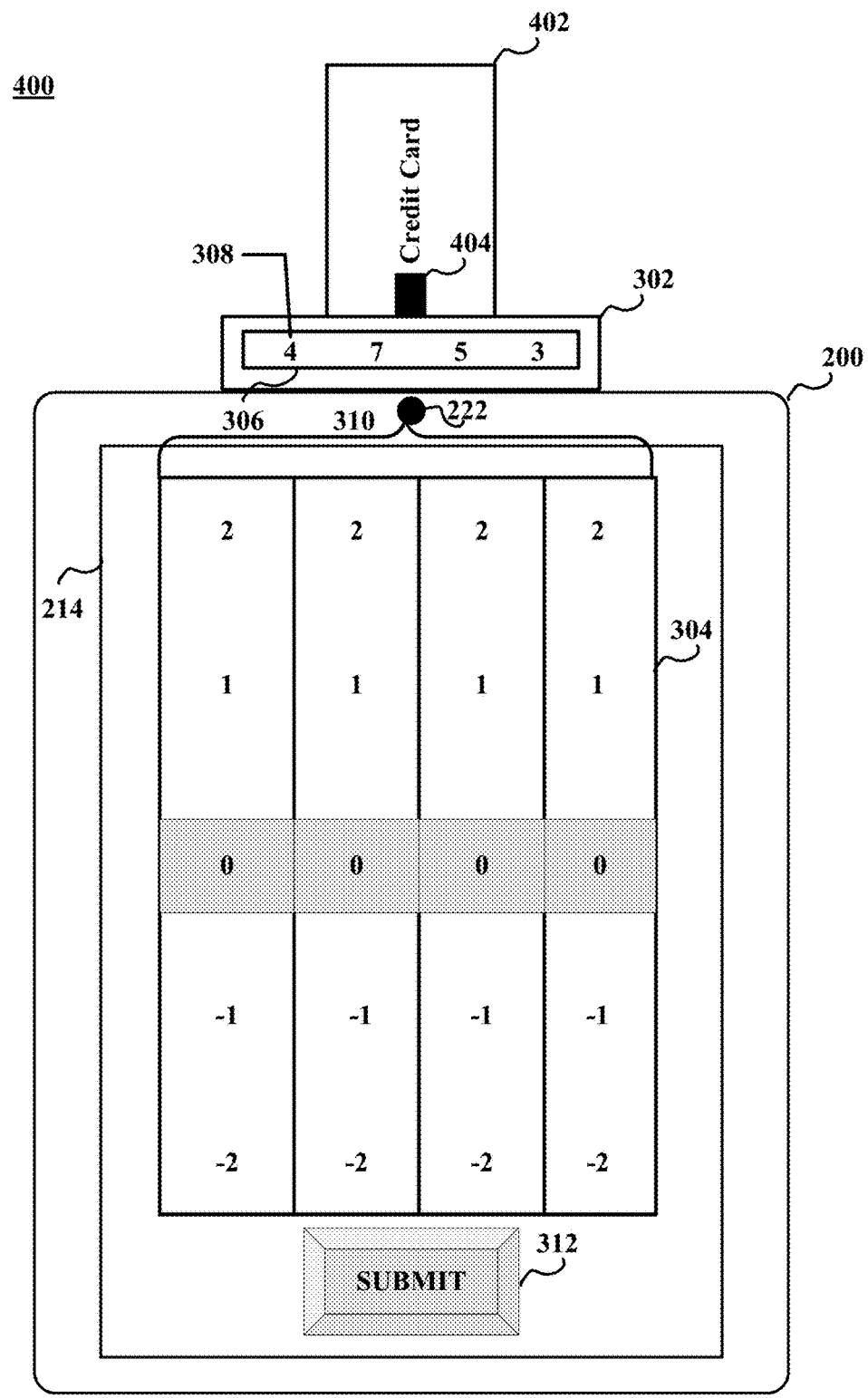
FIG. 4 is a diagram illustrating a system including a computing system in communication with a display unit having card or IC chip reader, consistent with some embodiments.

FIG. 4 is a diagram illustrating a system including a computing system in communication with a display unit having card or IC chip reader, consistent with some embodiments. System 400 is similar to system 300 except that display unit 302 includes a card reader for reading a financial transaction card 402, such as a credit or debit card. Further, the card reader may also include an IC chip reader for reading an IC chip 404 that may be embedded on card 402. Consistent with some embodiments, system 400 of display unit 402 and computing system 200 displaying user interface 304 may be capable of processing transactions using EMV or Chip and PIN credit cards. In such embodiments, display unit 302 displays an initial state 308 that includes four digits or characters. Although only four digits are shown, display unit 302 may be capable of displaying n digits or characters, consistent with the specifications of display component 302. A user using computing system 200 may interact with modifiers 310 to increment or decrement the digits of the credential until the user decides that the displayed credential is a final credential. When a final credential is reached, the user may select the "SUBMIT" button 312 or otherwise indicate that a final credential state has been reached, which initiates a transmission of a signal to display unit 302 that a final credential state has been reached. When display unit 302 receives the signal indicating that a final credential has been reached, display unit 302 transmits the final credential to computing system 200.

Consistent with some embodiments, display unit 302 may include instructions stored in the memory for execution by the one or more processors for encrypting the final credential before transmitting the final credential to computing system 200. Once computing system 200 receives the final PIN, computing system 200 may then transmit the final credential, along with other information, to remote server 106. The other information may include, for example, account information and payment details. In some embodiments, computing system 200 may check an accuracy or correctness of the final credential before transmitting to remote server 106. In some embodiments, display unit 302 may determine a correctness or accuracy of the final credential before transmission to computing system 200. In some embodiments, display unit 302 may be in communication with remote server 106 and may be capable of transmitting the final credential and any other information, which may be encrypted, to remote server 106 over network 108.

Figure 5:
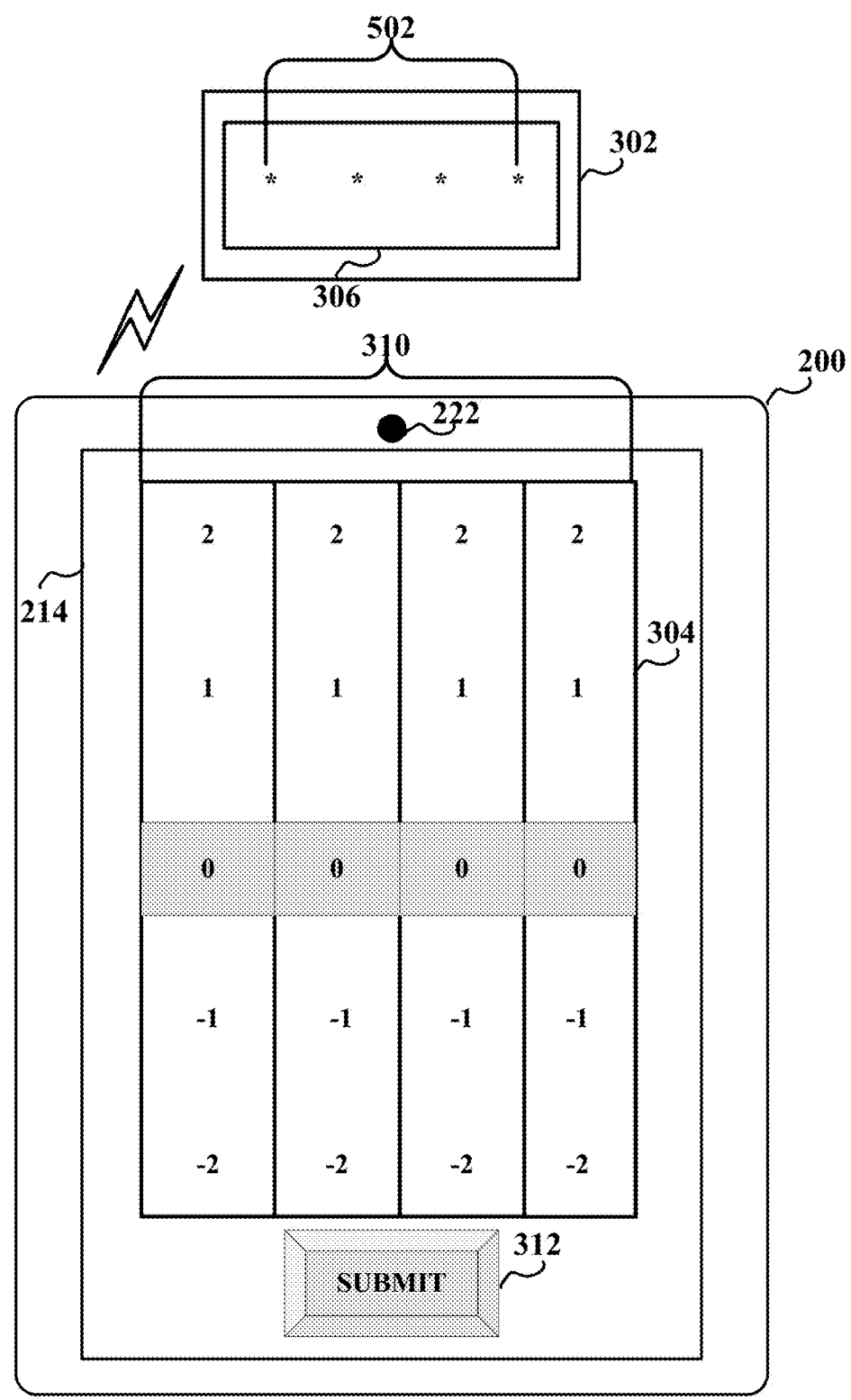
FIG. 5 is a diagram illustrating a system including a computing system in communication with a display unit, consistent with some embodiments.

FIG. 5 is a diagram illustrating a system including a computing system in communication with a display unit, consistent with some embodiments. System 500 is similar to system 300 except that display unit 302 obfuscates the displayed state 502. In some embodiments, the characters or digits of displayed state 502 may be obfuscated by starring the characters or digits of displayed state 502, blanking the characters or digits of displayed state 502, or other obfuscation of displayed state 502. Obfuscation of displayed state 502 may provide additional security for a user of system 500 by preventing an unauthorized person (e.g., a "shoulder surfer") from viewing a final state of a user credential displayed by display unit 302. In some embodiments, a character or digit of displayed state 502 may be shown normally for a predetermined amount of time sufficient for user to determine that the character or digit is correct before being obscured. In some embodiments, an initial state, such as initial state 308 shown in FIG. 3, may be a same initial state each time user uses system 500 such that user knows the initial state and can modify the digits or characters with modifiers 304 to reach a final state without having to explicitly see the displayed characters or digits. Obfuscation of displayed state 502 may also be achieved by displaying state such that only user 120 can view the state, such as on an eyeglass projection screen of a head mounted display. Alternatively, obfuscation of displayed state 502 may be achieved by placing a hood or cover over display unit 302 so that only user 120 facing display unit 302 may be able to view displayed state 502.

Figure 6:
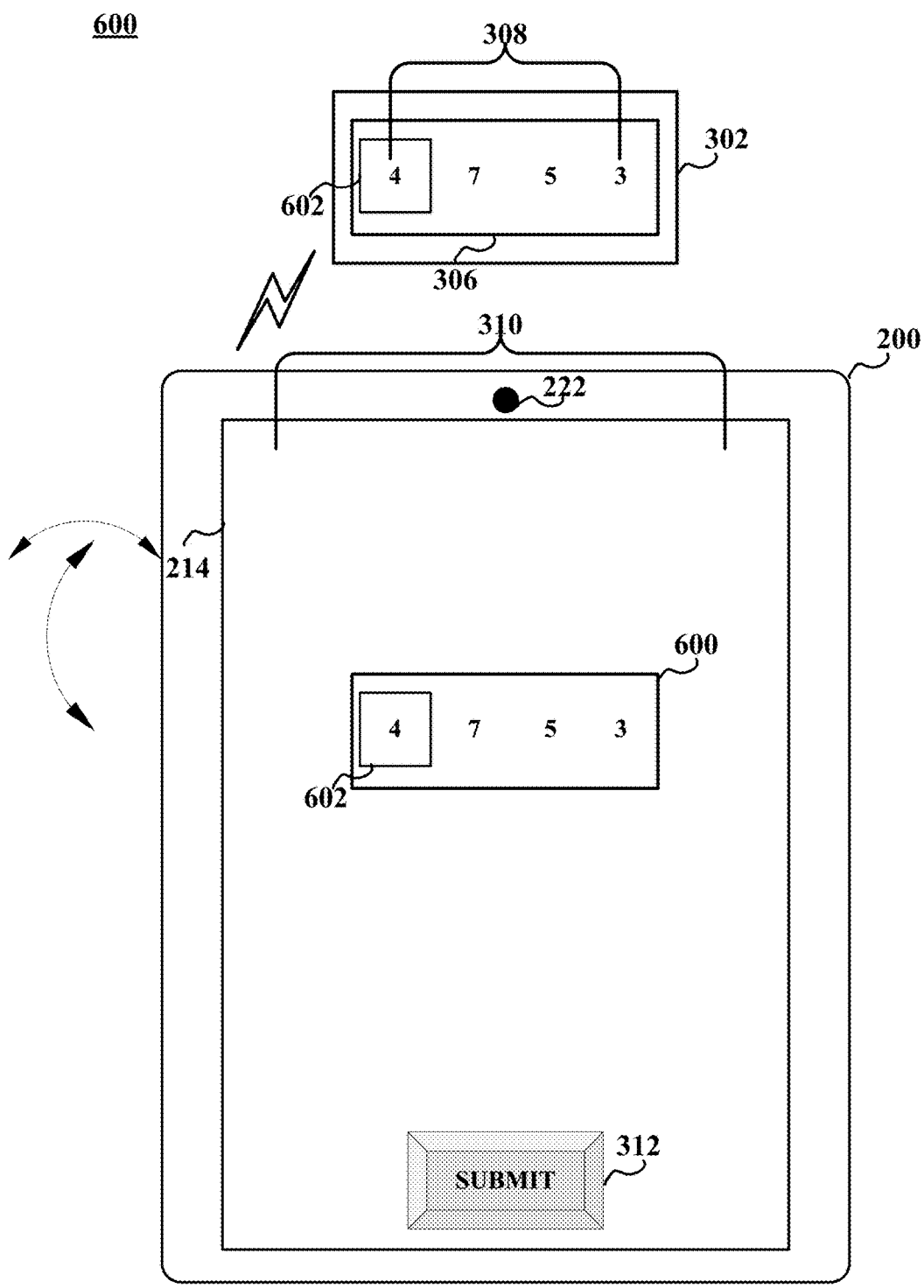
FIG. 6 is a diagram illustrating a system including a computing system in communication with a display unit, consistent with some embodiments.

FIG. 6 is a diagram illustrating a system including a computing system in communication with a display unit, consistent with some embodiments. System 600 is similar to systems 300 and 500, except that computing system 200 includes a display 600 configured to display characters or digits of a credential. As shown in FIG. 6, display includes one character or digit highlighted 602 indicating the current character or digit. Consistent with some embodiments, system 600 may generate a random state in display 600 (or display component 306 similar to system 300) and user 120 may make a selection of a character or digit of a credential by moving computing device 200 such that an accelerometer in sensing components detects the motion and changes the highlighted character or digit 602 in display 600 or display unit 306 based on the detected motion. For example, user 120 may tilt computing device up or down to increase or decrease a value of highlighted character or digit 602. User 120 may then tilt computing device to the right to move highlight 602 to the next character or digit, and so forth. Once a final state has been reached that user 120 believes corresponds to their credential, user 120 may then indicate a final state by pressing submit button 312, similar to systems 300 and 500, or other selection method that may be detected by sensor components 222. User 120 may be able to shake computing device vigorously to generate a new initial state and begin the process again. The initial state and character or modifications made thereto may occur on display 600 on computing device 200 or on a coupled display unit 302.

Figure 7:
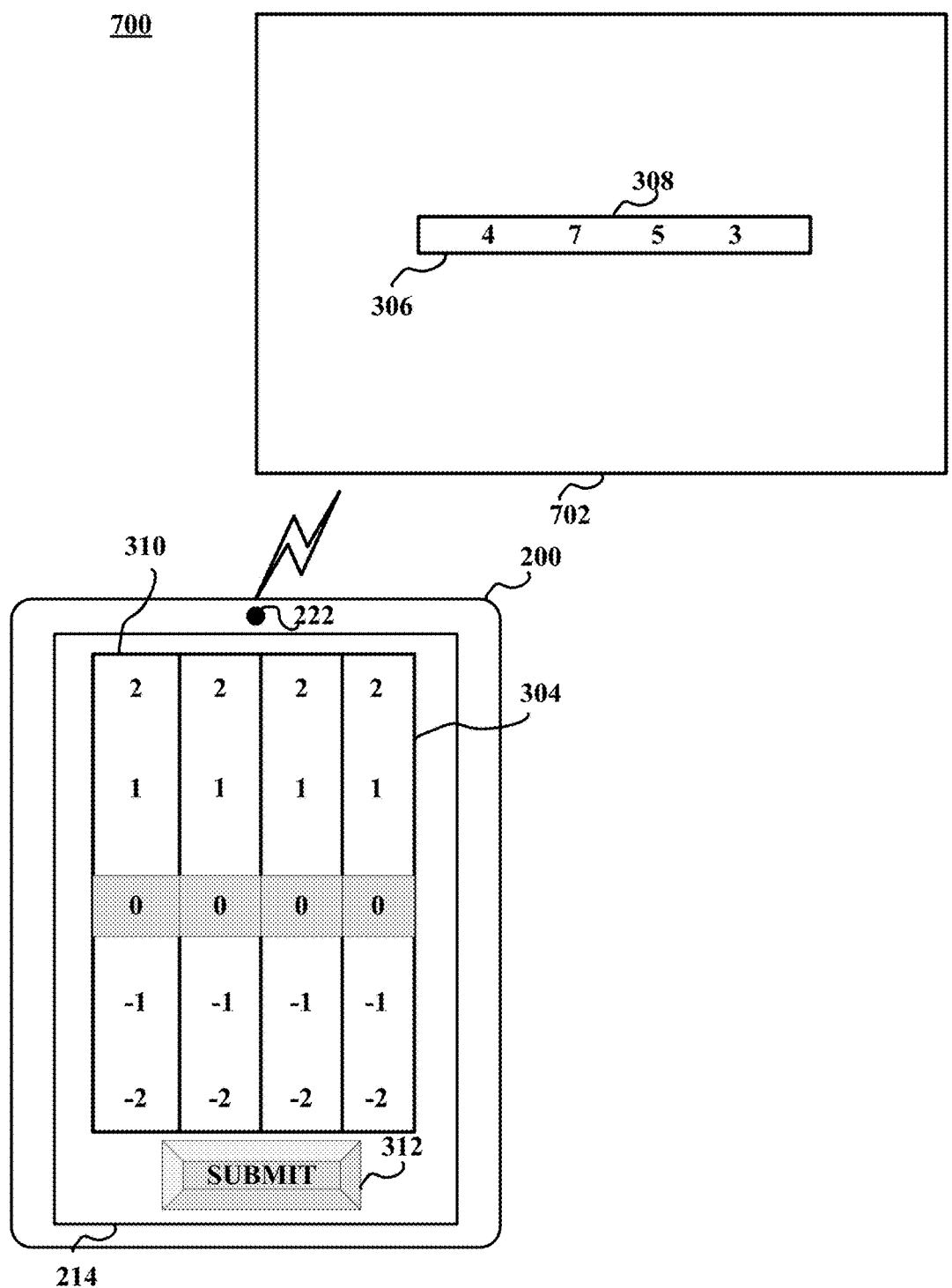
FIG. 7 is a diagram illustrating a system including a computing system in communication with a display unit, consistent with some embodiments.

FIG. 7 is a diagram illustrating a system including a computing system in communication with a display unit, consistent with some embodiments. System 700 is similar to systems 300 and 500, except that computing system 200 may be in communication with a display unit 702 that may correspond to an automatic teller machine (ATM) display or a building entrance or door entry display. Consistent with some embodiments, system 700 may operate in the same manner as system 300 or 500 except the entered credential may allow the user to enter a secured room or building, or to enter their credential at an ATM machine. In such embodiments, computing system 200 may be further in communication with a building security provider or a bank, such that an encrypted final state of a credential that is provided by display unit is transmitted to the building security provider or bank. In some embodiments, the displayed state may be obfuscated similar to system 500.

Figure 8:
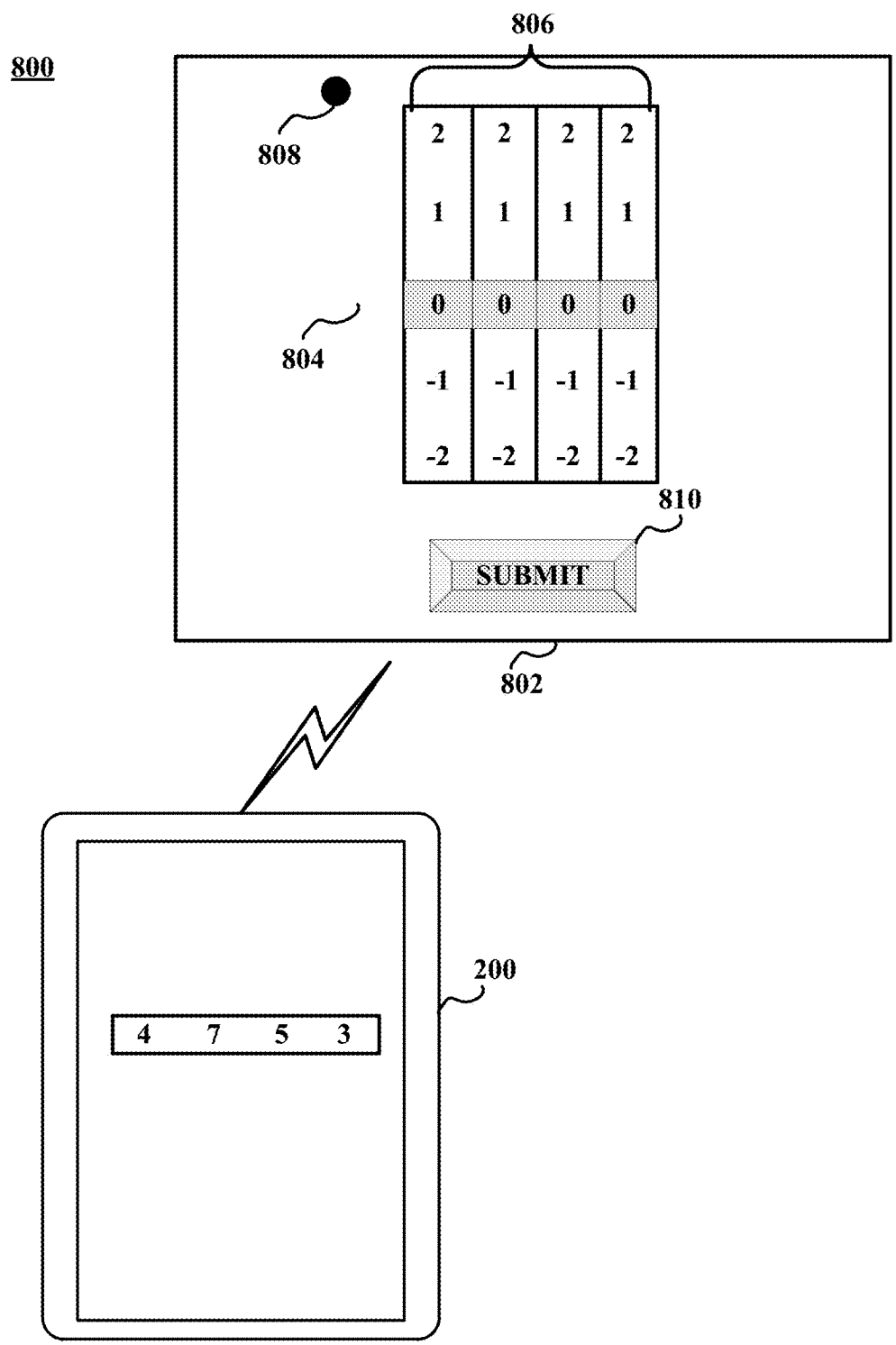
FIG. 8 is a diagram illustrating a system including a computing system in communication with a display unit, consistent with some embodiments.

FIG. 8 is a diagram illustrating a system including a computing system in communication with a display unit, consistent with some embodiments. System 800 is similar to systems 300, 500, and 700, except that computing system 200 operates similar to display unit 302 in systems 300, 500, and 700, and terminal 802 operates similar to computing system 200. That is, a user may be presented with a user interface 804 at terminal 802 that displays modifiers 806 that a user may interact with in order to modify or otherwise change a state of a credential displayed by computing device 200 that is in communication with terminal 802. Terminal 802 may also include sensors 808 which may detect character modification by user and generate a character modification signal that may be used to modify a state of a credential displayed on computing system 200. Sensors 808 may be used along with modifiers 806 to modify a state of a credential by, for example, modifying individual digits or characters of the state of the credential. When a final state of a credential is displayed by computing system 200, the user may then select the "SUBMIT" button 810 to transmit the final state of the credential to terminal 802, which may then transmit the final state of credential to remote server 106 over network 108, a building security provider, or a bank, consistent with previous embodiments. Moreover, the final state of the credential may be encrypted before transmission to terminal 802 and/or before transmission to remote server 106 over network. Furthermore, computing system 200 may be in communication with remote server 106 over network 108, building security provider, or bank and may transmit the final state of credential to remote server 106 over network 108, such transmissions being encrypted and secure.

Figure 9:
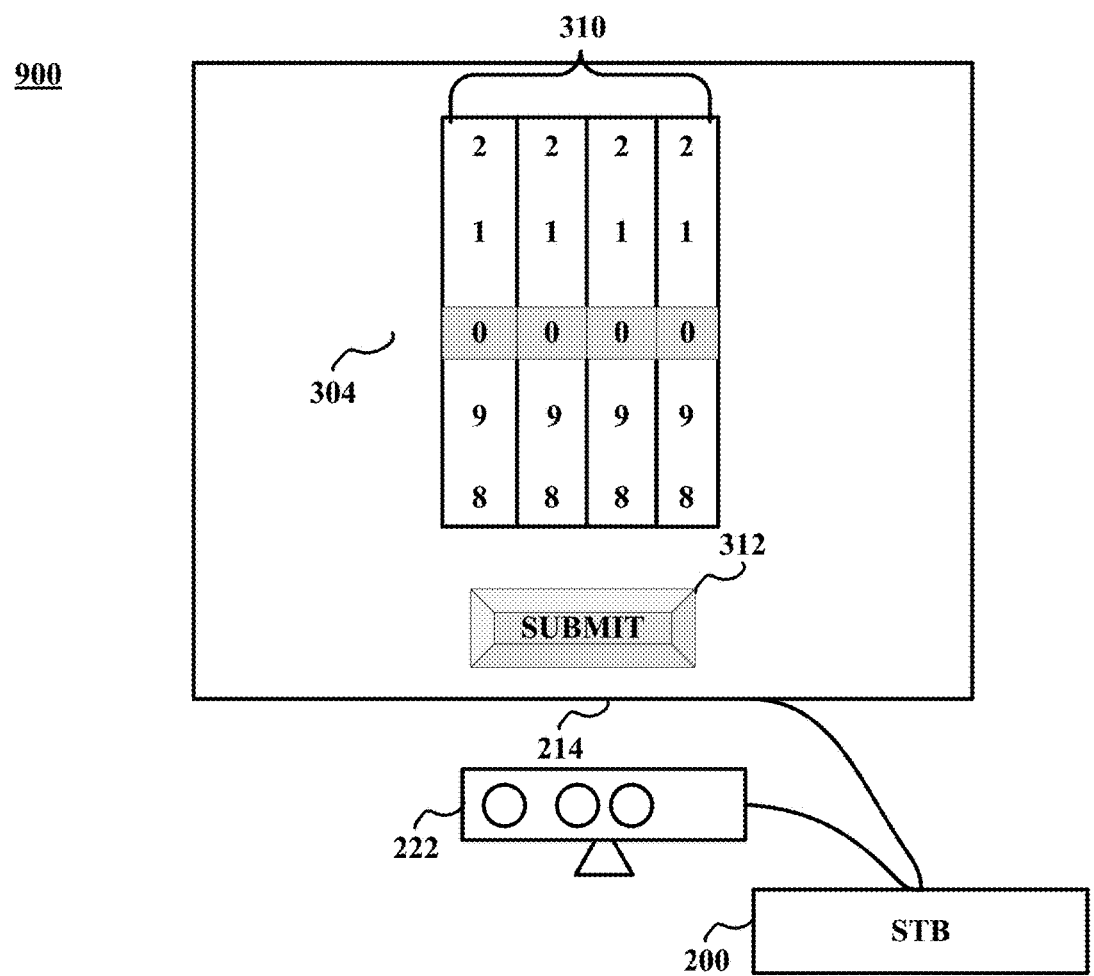
FIG. 9 is a diagram illustrating a system including a computing system in communication with a display unit, consistent with some embodiments.

FIG. 9 is a diagram illustrating a system including a computing system in communication with a display unit, consistent with some embodiments. System 900 in FIG. 9 includes some similarities to system 300. System 900 includes a computing system 200, depicted as a set-top box (STB), coupled to sensors 222 and a display unit 214. As shown in FIG. 9, sensors 222 may be a camera, such as a depth camera, or other type of camera capable of capturing image-related information. As shown in FIG. 9, display unit 214 may display a user interface 304 that includes one or more modifiers 310 that are used as inputs for transmitting signals indicative of character or digit modifications for inputting a credential. Consistent with some embodiments, modifiers 310 may represent a specific increment or decrement of the digits of the credential, similar to system 300. In some embodiments, such as shown in FIG. 9, the modifiers may include numeric digits or characters and may be configured to manipulated to display a credential. When a desired credential is reached, the user may select the "SUBMIT" button 312 which initiates a transmission of a signal to remote server 106 including an encrypted version of the credential. Although not shown in FIG. 9, system 900 may also be used with a display unit, such as display unit 302 similar to system 300.

In some embodiments a user may be able to manipulate modifiers 310 by making motions with their hand or arm to select a character or digit of a credential. For example, sensors 222 a camera, such as described above, that may be configured for detecting the motions made by the user. Sensors 222 may detect this motion and translate the detected motion into an electrical signal that is sent to computing system 200. Computing system 200 may then translate the electrical signals into manipulations of modifiers 310 that may be further displayed on display component 214. Consequently, a user of system 900 may be able to use system 900 to enter a credential that may be used, in some embodiments, to authenticate to a server such as remote server 106. In some embodiments, system 900 may correspond to a wearable computing device, wherein computing system 200 is wearable and includes coupled or integrated sensors 222 such as a camera or a head-mounted display or eyeglass display corresponding to display component 214 or combination thereof.

FIG. 10 is a diagram illustrating a one dimensional random sequence of characters of a credential, consistent with some embodiments. Systems 300, 400, 500, 600, 700, 800, and 900 shown in FIGS. 3-9 having characters of a credential represented by digits that may be selected by manipulating modifiers, such as in system 900 shown in FIG. 9, or having a coupled display unit 302 that may be configured to display a state corresponding to a credential, wherein modifiers 310 may be manipulated to increment or decrement a specific digit or character to ultimately obtain a desired state that may be indicative of a credential. FIGS. 10-12, however, show additional character credential selection and modification systems, consistent with some embodiments. The character credential selection and modification systems shown in FIGS. 10-12 may be combined with the selection methods and systems shown in and discussed with respect to FIGS. 3-9.

As shown in FIG. 10, sequence 1000 having one of the numbers thereof highlighted by a box 1002 may be displayed in user interface 304 on display component 214 for user selection. Sequence 1000 may be provided to client computing device 102 by remote server 106 through authentication apps 122 and 112. Sequence 1000 may also be generated by client computing device 102 by authentication app 112. In some embodiments, a user may be able to manipulate box 1002 to select a character or digit of a credential. Manipulations may be made by touching box 1002 and moving box 1002 by touching, if display component 214 is a touch-screen display. In some embodiments, a user may manipulate box using an input component, such as input component 216, which may include, for example, a keyboard or key pad, whether physical or virtual. In some embodiments, a user may manipulate box 1002 using a navigation control component, such as navigation control component 218 which may be a mouse, a trackball, or other such device. Moreover, a user may manipulate box 1002 by making motions or gestures that are captured by sensors 222. In some embodiments, sensors 222 may correspond to a camera, such as shown in FIG. 9, that is coupled to a set-top box coupled to a display component that displays sequence 1000 and box. Sensors 222 may correspond to a camera that is coupled to or integrated with a wearable computing device including a head-mounted display or eyeglass display that displays sequence 1000 and box 1002. Sensors 222 may also correspond to a brain wave sensor, such as an EEG.

Returning to FIG. 10, sequence 1000 is as being oriented horizontally but, however, may be oriented vertically or at any angle. Moreover, sequence 1000 need not be linear and can be curved. Sequence 1000 may have any shape or configuration. Box 1002 may highlight one or more of the digits or characters at a time. Although a box is shown, it may other means may be used for highlighting the displayed character or digits in sequence 1000. In some embodiments, box 1002 may be manipulated to move from left to right across the digits or characters or from right to left across the digits or characters. After sweeping across the characters or digits, box 1002 may begin a new sweep in the same direction as the previous sweep or can sweep back and forth so as to alternate sweeping directions. Box 1002 may move randomly or in any other fashion across or among the characters or digits of sequence 1000.

In some embodiments, instead of a user manipulating box 1002 to move across character or digits of sequence 1000 to select a character or digit of a credential, box 1002 may automatically move at any desired speed across the characters or digits of sequence 1000. For example, box 1002 may move sufficiently rapidly across the characters or digits of sequence 1000 so as to inhibit a bystander from readily determining which number is being selected by the user. Box 1002 may move sufficiently slowly across the characters or digits of sequence 1000 so as to allow the user to reliably select a desired character or digit of sequence 1000. In some embodiments, a first random sequence 1000 is presented to the user and box 1002 begins to move across the characters or digits of sequence 1000. In some embodiments, box 1002 may move across the character or digits of sequence 1000 at a rate that changes as a function of time, such that experienced users may have a rate that is greater than less experienced users. In some embodiments, the rate may be provided by authentication app 122 of remote server 106 to client computing device 102 as part of an authentication process. Information representative of when box 1002 begins to move, e.g., timing information, may be communicated to client computing device 102 and/or remote server 106. When a first character or digit of the user's credential is highlighted, the user may make a selection of that character or digit by manipulating box 1002 in at least one of the ways described previously. Information representative of the time of the selection, e.g., timing information, may be communicated to client computing device 102 and/or remote server 106, which may determine which character or digit of sequence 1000 was selected using the known random sequence 1000 and the timing information. The timing information may be the elapsed time between the start of each sweep across the characters or digits of sequence 1000 and the time at which the user manipulated box 1002 to select a character or digit. This process can repeat for each character or digit of the user's credential. When the entire credential has been entered, the user can indicate that the credential is in a final state by pressing a submit button, such as submit button 312. Alternatively, the process may be automatically ended when a valid credential has been entered or when a predetermined number of characters or digits has been selected. In some embodiments, the timing of the selection can be used to calculate a position of box 1002 and the highlighted character or digit rather than transmitting the selected character or digit to computing system 200, display unit 302, or remote server 106. Moreover, in some embodiments, a beginning position, movement or sweep rate of box 1002 may be randomly initialized for each attempt. Further, a behavior of the movement or sweep may be changed on each presentation to either reverse at an end of the characters or digits of sequence 1000 or wrap around to a beginning of sequence 1000.

FIG. 11 is a diagram illustrating a two dimensional random sequence of characters of a credential, consistent with some embodiments. Sequence 1100 shown in FIG. 11 is similar to sequence 1000 shown in FIG. 10, except has character or digits arranged in two dimensions. Box 1102 may be manipulated to select a character or digit of a credential in a manner similar to box 1002 described above with respect to FIG. 10. Although sequence 1100 is shown as being rectangular, in some embodiments, sequence 1100 may be elongated, square, round, oval, or any other shape.

Box 1102 may highlight one or more characters or digits of sequence 1100 at a time. Box 1102 may automatically move, or be manipulated to move, randomly or in any other fashion across or among the characters or digits of sequence 1100. Moreover, box 1102 may move at any desired speed across the characters or digits of sequence 1100. In some embodiments, a user may select characters or digits of sequence 1100 by manipulating box 1102 or, if box is moving automatically, can provide an indication when box 1102 is on a character or digit of a credential, similarly to sequence 1000 in FIG. 10, except that box 1102 may move or be manipulated in two dimensions, e.g., from side to side and up and down instead of in one dimension e.g., only from side to side.

FIG. 12 is a diagram illustrating a two dimensional random array of characters of a credential, consistent with some embodiments. As shown in FIG. 12, array 1200 may have one row of two digit characters indicated by a row highlight 1202 and having one column indicated by a column highlight 1204, in accordance with one or more embodiments. Row highlight and 1202 and column highlight 1204 may intersect and form a box 1206 which may indicate a selected two digit character. In some embodiments, manipulating row highlight 1202 and column highlight 1204 may allow a user to select two characters or digits of a credential at a time, such that a credential having four characters or digits may be selected by two selections, and a credential having six characters or digits may be selected by three selections, and so forth. Row highlight 1202 and column highlight 1204 may be automatically scanned up and down and left to right, respectively, or may be manipulated by a user similar to box 1002 described with respect to FIG. 10. Moreover, a user may select characters of a credential from array 1200 similar to how a user would select characters from sequence 1000 or 1100, in some embodiments.

The characters or digits of sequences 1000 and 1100 and array 1200 may be present in an image (such as a raster image) or text (such as ASCII text). In some embodiments, characters or digits of sequences 1000 and 1100 and array 1200 may have a different font, size, alignment and/or spacing. A series of images may be used to show the highlight moving from one number, row, or column to another. Sequences 1000 and 1100 and array 1200 may be created by a service such as an image service provided by, for example, authentication app 122 of remote server 106 or authentication app 112 of client computing device 112. Timing information may be communicated from client computing device 102 to the remote server 106 to determine each selected character or digit of a credential.

Figure 13:
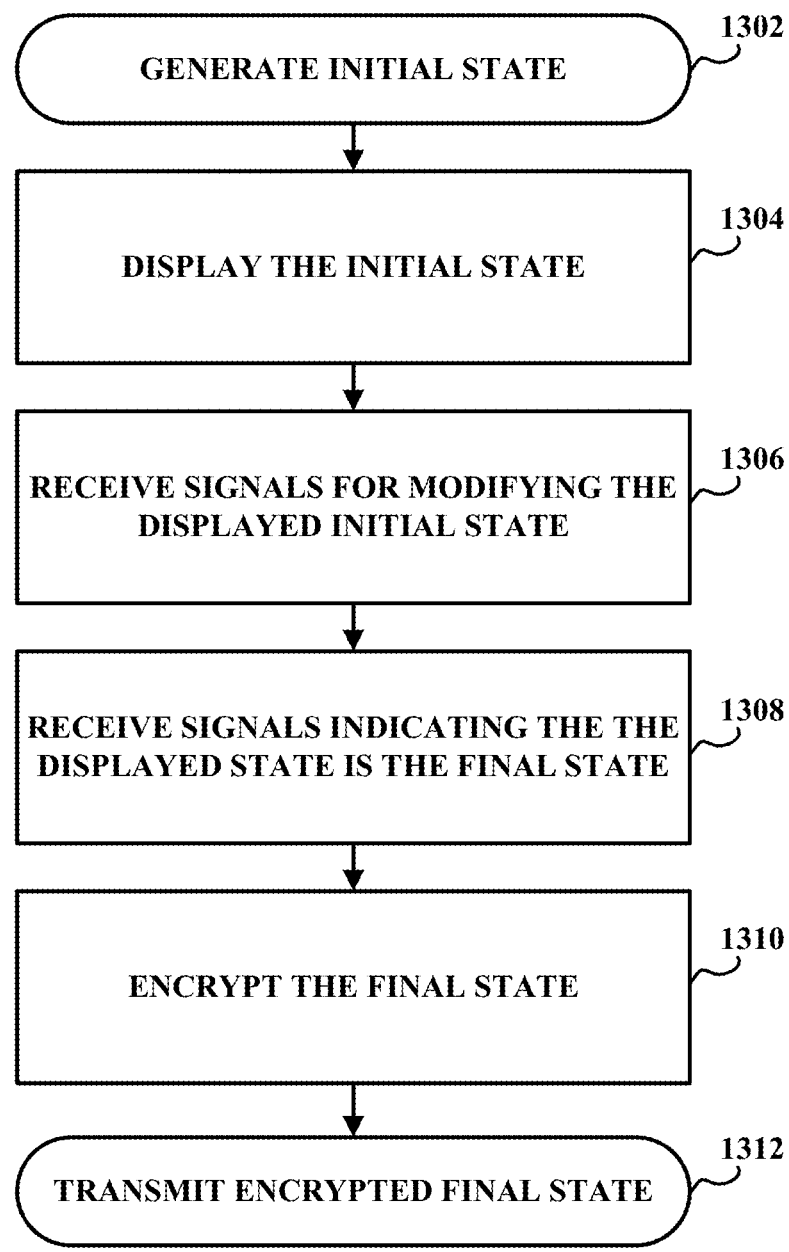
FIG. 13 is a flowchart illustrating a method for inputting a state, consistent with some embodiments.

FIG. 13 is a flowchart illustrating a method for inputting a state, consistent with some embodiments. For the purpose of illustration, FIG. 13 may be described with reference to any of FIGS. 1-9. The method shown in FIG. 13 may be embodied in computer-readable instructions for execution by one or more processors such that the steps of the method may be performed by computing system 200 and/or display unit 302. As shown in FIG. 13, display unit 302 may generate an initial state 308 (1302) that may be displayed by a display component 306 of display unit 302 (1304). Display unit 302 may then receive signals for modifying initial state 308 (1306). Consistent with some embodiments, the signals for modifying initial state 308 may be generated by computing system 200 in communication with display unit 302. Display unit 302 may then receive a signal indicating that the displayed state is the final state (1308). Display unit 302 may then encrypt the final state (1310) and transmit the encrypted final state (1312). Consistent with some embodiments, the encrypted final state may be transmitted to computing system 200 or remote server 106. Moreover, the final state may be authenticated before transmitting. In some embodiments, the authentication may be performed by checking at least one of a digital signature or a MAC address associated with display unit 302. Although the steps shown in FIG. 13 are described as being performed by display unit 302, they may also be performed by computing system 200, or a combination thereof.

Figure 14:
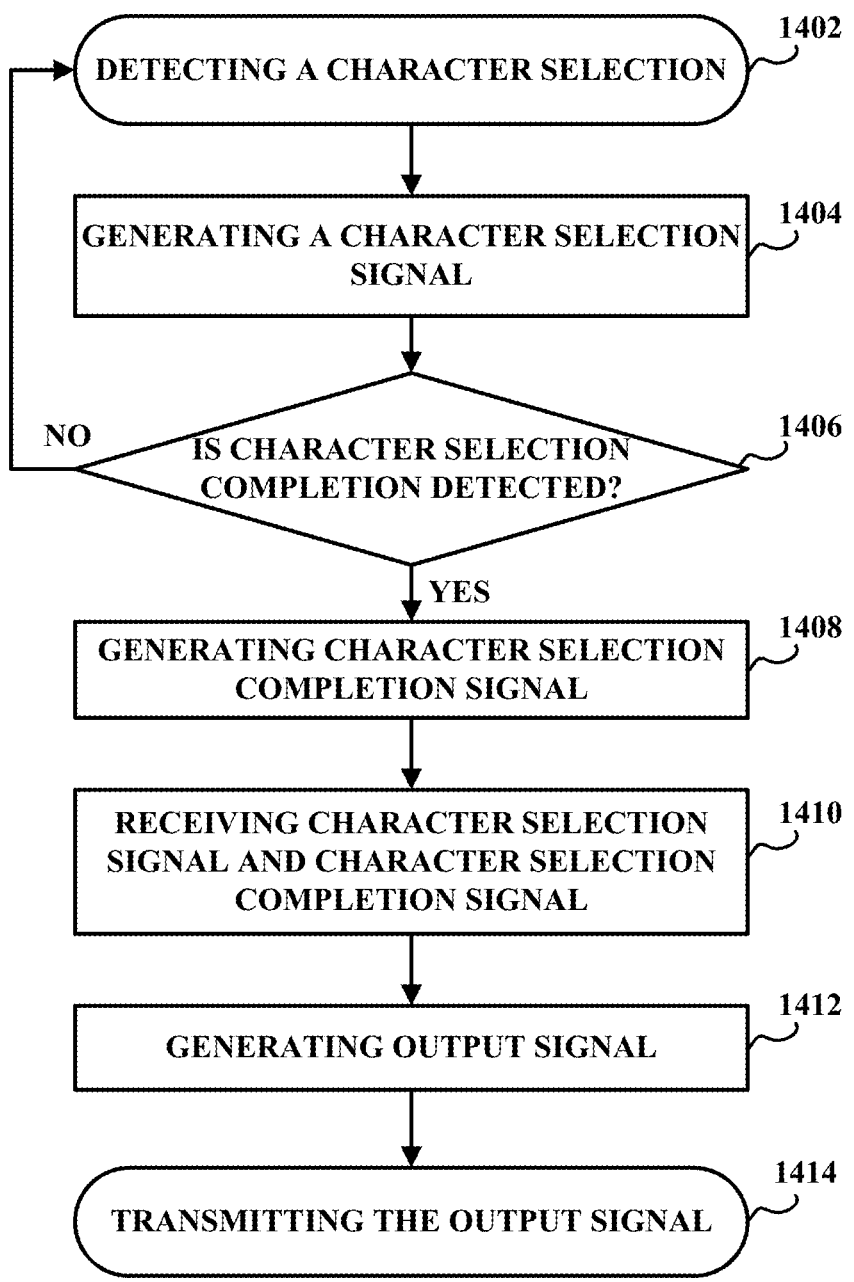
FIG. 14 is a flowchart illustrating a method for character credential selection, consistent with some embodiments.

FIG. 14 is a flowchart illustrating a method for character credential selection, consistent with some embodiments. For the purpose of illustration, FIG. 14 may be described with reference to any of FIGS. 1-9. The method shown in FIG. 14 may be embodied in computer-readable instructions for execution by one or more processors such that the steps of the method may be performed by computing system 200. As shown in FIG. 14, the method includes detecting a character selection (1402). In some embodiments, a character selection may be detected by sensors 222, which may be a camera, microphone, accelerometer, or brain wave sensor such as an EEG. In some embodiments, a character selection may be detected by a touch-screen device having an integrated touch sensor. Character selection may be made by manipulating modifiers 310 to increment or decrement a character or digit of a credential state displayed on a coupled display unit 302. Character selection may be made by manipulating box 1002, 1102, or row highlight 1202 and column highlight 1204 until a desired character or digit is highlighted for selection. Character selection may also be made by making an indication when box 1002 or 1102, or row highlight 1202 and/or column highlight 1204 are highlighting a desired character or digit. Moreover, character selection may be made by manipulating modifiers 310 until a desired character or digit is highlighted for selection. Modifiers 310 and boxes 1002 and 1102, and row highlight 1202 and column highlight 1204 may be manipulated using at least one of input component 216 and navigation control component 218, or sensors 222, which may detect a motion or movement or other information associated with a user.

The detection of a character selection may generate a character selection signal (1404). In some embodiments, the character selection signal may include information related to the character selection, such as the selected character or digit. Steps 1402 and 1404 may be repeated until a character selection completion is detected (1406). In some embodiments, detecting a character selection completion includes detecting a user pressing submit button 312 in user interface 304. Detecting a character selection completion may also include detecting when user makes an indication that character selection is complete, a valid credential has been entered, or when a predetermined number of or characters or digits has been selected. A character selection completion signal may then be generated (1408). One or more processors of processing component 206 may then receive the character selection sign and character selection completion signal (1410) and generate an output signal (1412). In some embodiments, the generated output signal may include credential components. The credential components may include the selected character or digits of the credential. The credential components may include additional information associated with a credential, such as a user name, account information, and transaction amount. Network interface component 202 may then transmit the generated output signal (1414). In some embodiments, the generated output signal may be transmitted to remote server 106 over network 108 for authenticating with remote server 106 or to authorize a payment. Although the steps shown in FIG. 14 are described as being performed by computing system 200, they may also be performed by display unit 302, remote server 106, or a combination thereof.

Figure 15:
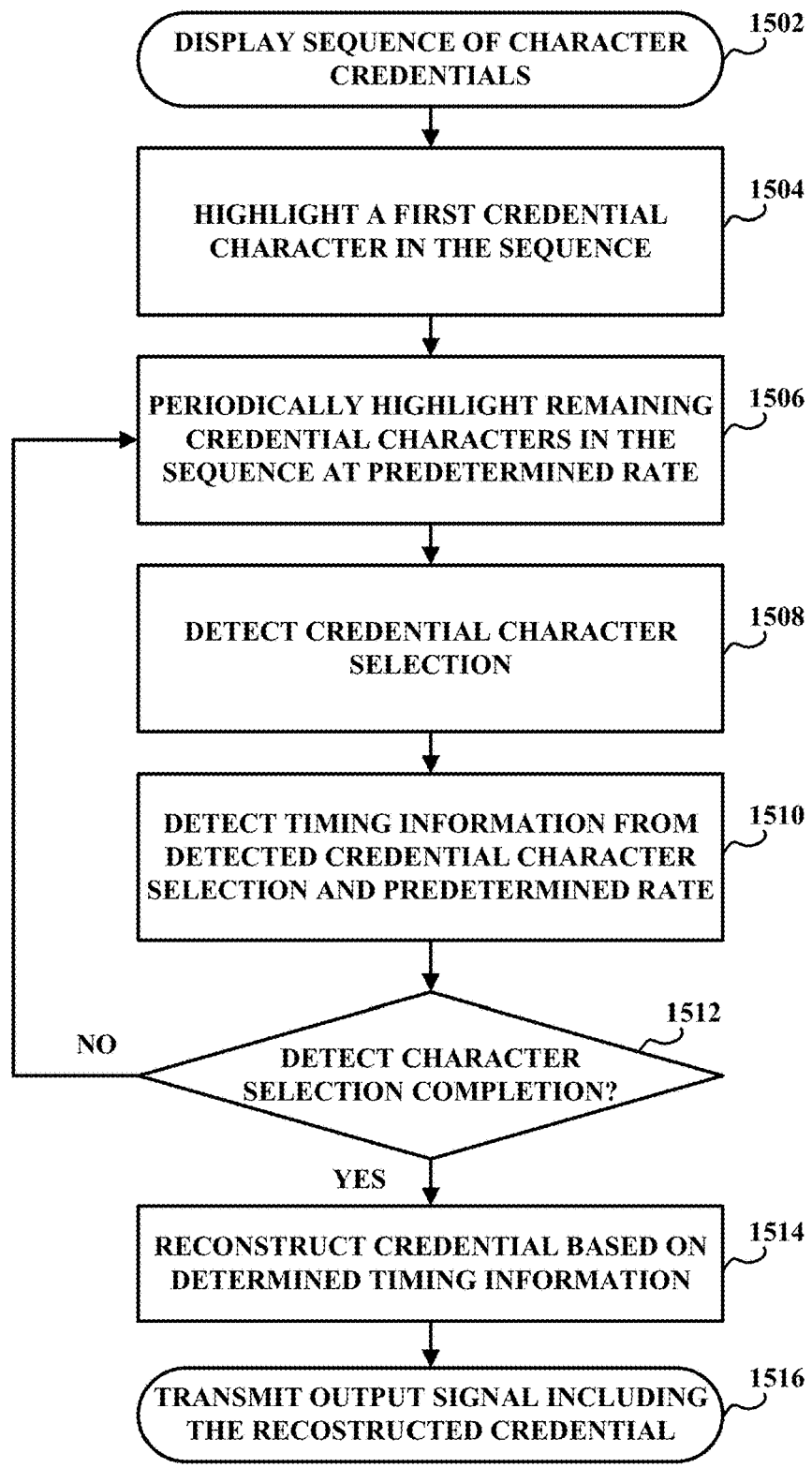
FIG. 15 is a flowchart illustrating a method for character credential selection, consistent with some embodiments.

FIG. 15 is a flowchart illustrating a method character credential selection, consistent with some embodiments. For the purpose of illustration, FIG. 15 may be described with reference to any of FIGS. 1-12. The method shown in FIG. 15 may be embodied in computer-readable instructions for execution by one or more processors such that the steps of the method may be performed by computing system 200 and/or display unit 302. As shown in FIG. 15, the method begins by displaying a sequence of character credentials (1502). In some embodiments, the displayed sequence may be a one-dimensional sequence, such as sequence 1000, a two-dimensional sequence such as sequence 1100, or an array such as array 1200. Moreover, the characters in the sequence may be randomly generated, and may include characters or digits that make up a credential of user 120. Further, the displayed sequence may be displayed based on instructions received from remote server 106 when client computing device 102 attempts to authenticate to remote server 106. The sequence may be displayed on display component 214 of computing device 200, which may correspond to client computing device 102, or display component 306 of display unit 302. A first credential character in the sequence may be highlighted (1504). The first credential character that is highlighted may be any character in the displayed sequence, and may be chosen randomly. Moreover, the credential character that is highlighted may be highlighted by a box, such as box 1002 or 1102, or a row or column such as shown in FIG. 12.

Remaining characters in the sequence may then be periodically highlighted at a predetermined rate (1506). The rate may be variable based on a user's experience with the character credential selection method, or the rate may be fixed. The rate may be determined according to instructions provided by remote server 106 during an authentication attempt, or may be set locally by authentication app 112 or user 120. A character credential selection may then be detected (1508). In some embodiments, a character selection may be detected by sensors 222, which may be a camera, microphone, accelerometer, or brain wave sensor such as an EEG. In some embodiments, a character selection may be detected by a touch-screen device having an integrated touch sensor. Character selection may also be made by making an indication when box 1002 or 1102, or row highlight 1202 and/or column highlight 1204 are highlighting a desired character or digit, that is detected by sensors 222. Processing component 206 may then determine timing information from the detected character selection and the known rate of highlighting (1510).

A determination may then be made to see if a character selection completion has been detected (1512). In some embodiments, detecting a character selection completion includes detecting a user pressing submit button 312 in user interface 304. Detecting a character selection completion may also include detecting when user makes an indication that character selection is complete, a valid credential has been entered, or when a predetermined number of or characters or digits has been selected. If a character selection completion has not been detected, steps 1506-1510 may be repeated. If a character selection completion is detected, processing component 206 may reconstruct the credential based on the determined timing information (1514) and transmit an output signal including the reconstructed credential (1516). In some embodiments, only the timing information may be included in the output signal such that remote server 106 reconstructs the credential server-side for added security.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices capable of securely processing transactions involving a PIN. For examples, embodiments as described herein may enable the secure input of PINs using an input device in communication with a display device that displays the PIN being input. In particular, embodiments as described herein may be used to enable secure mobile payment processing of chip and PIN cards using a mobile device and mobile card and IC chip reader. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system, comprising:
    a non-transitory memory; and
    one or more hardware processors coupled to the non-transitory memory and configured to read instructions from the non-transitory memory to cause the system to perform operations comprising:
        providing alphanumeric characters to a user in a sequence;
        randomly highlighting at least a subset of the alphanumeric characters in the sequence;
        generating an output signal comprising an elapsed time associated with a selection by the user of one of the alphanumeric characters from the subset during the random highlighting; and
        transmitting the generated output signal comprising the elapsed time to a remote server to authenticate the user, wherein the elapsed time contains information that enables the remote server to determine which one of the alphanumeric characters was selected based, at least in part, on a layout of the alphanumeric characters.

2. The system of claim 1, wherein the elapsed time is an amount of time between a beginning of the random highlighting and the selection by the user.

3. The system of claim 2, wherein the transmitted signal comprises the elapsed time but does not contain the one of the alphanumeric characters that was selected.

4. The system of claim 1, wherein the alphanumeric characters are received from the remote server in a random order.

5. The system of claim 1, wherein the random highlighting is based on a rate received from the remote server.

6. The system of claim 1, wherein the operations further comprise:
    ending the random highlighting in response to receiving a selection completion signal.

7. The system of claim 1, wherein:
    the random highlighting is performed via a movable position indicator;
    the selection by the user is made via a user engagement of the movable position indicator;
    the operations further comprise: calculating a position of the movable position indicator with respect to a layout of the alphanumeric characters.

8. The system of claim 1, wherein the operations further comprise:
    generating a reorganization of the alphanumeric characters in response to shaking a device configured to detect user selections.

9. The system of claim 1, wherein the operations further comprise:
    modifying one of the alphanumeric characters, when randomly highlighted, based on a user input.

10. A method of credential character selection, comprising:
    providing, by a user device, a plurality of alphanumeric characters to a user in a sequence;
    randomly highlighting, by the user device, one or more of the plurality of alphanumeric characters in the sequence for selection;
    generating, by the user device, an output signal comprising an elapsed time associated with a selection of the randomly highlighted one or more of the plurality of alphanumeric characters, wherein the elapsed time contains information for determining the selection of the randomly highlighted one or more of the plurality of alphanumeric characters at least in part based on a layout of the plurality of the alphanumeric characters; and
    transmitting, by the user device, the generated output signal comprising the elapsed time to a remote server to authenticate the user.

11. The method of claim 10, wherein the transmitted signal comprises the elapsed time but does not contain the selection of the randomly highlighted one or more of the plurality of alphanumeric characters.

12. The method of claim 11, wherein the transmitted signal comprises the elapsed time but does not contain the selection of the randomly highlighted one or more of the plurality of alphanumeric characters.

13. The method of claim 10, further comprising:
    ending, by the user device, the random highlighting in response to receiving a selection completion signal.

14. The method of claim 10, further comprising:
    detecting, by a sensor of the user device, a selection associated with the randomly highlighted one or more of the plurality of alphanumeric characters.

15. The method of claim 10, wherein the plurality of alphanumeric characters are received from the remote server in a random order, and wherein the one or more of the plurality of alphanumeric characters are randomly highlighted based on a rate received from the remote server.

16. A non-transitory machine-readable medium having stored thereon machine-readable instructions executable to cause a machine to perform operations comprising:
    providing a plurality of alphanumeric characters to a user, the plurality of alphanumeric characters having a random sequence;
    randomly highlighting one or more of the plurality of alphanumeric characters in the random sequence for selection;
    generating an output signal comprising an elapsed time associated with a selection of the randomly highlighted one or more of the plurality of alphanumeric characters, wherein the elapsed time contains information for determining the selection of the randomly highlighted one or more of the plurality of alphanumeric characters at least in part based on a layout of the plurality of the alphanumeric characters; and
    transmitting the generated output signal comprising the elapsed time to a remote server to authenticate the user.

17. The non-transitory machine-readable medium of claim 16, wherein the operations further comprise:
ending the random highlighting in response to receiving a selection completion signal.

18. The non-transitory machine-readable medium of claim 16, wherein the elapsed time is an amount of time between a beginning of the random highlighting and the selection of the randomly highlighted one or more of the plurality of alphanumeric characters by the user.

19. The non-transitory machine-readable medium of claim 18, wherein the transmitted signal comprises the elapsed time but does not contain the selection of the one or more of the plurality of alphanumeric characters.

20. The non-transitory machine-readable medium of claim 16, wherein the one or more of the plurality of alphanumeric characters are randomly highlighted based on a rate received from the remote server.

* * * * *